US006369000B1

(12) United States Patent
Johnson et al.

(10) Patent No.: US 6,369,000 B1
(45) Date of Patent: Apr. 9, 2002

(54) PROCESS FOR PRODUCING A METAL ALUMINATE CATALYST SUPPORT

(75) Inventors: Marvin M. Johnson; Tin-Tack Peter Cheung; Darin B. Tiedtke, all of Bartlesville, OK (US)

(73) Assignee: Phillips Petroleum Company, Bartlesville, OK (US)

(*) Notice: Subject to any disclaimer, the term of this patent is extended or adjusted under 35 U.S.C. 154(b) by 0 days.

(21) Appl. No.: 09/398,654

(22) Filed: Sep. 17, 1999

(51) Int. Cl.[7] .................................................. B01J 32/00
(52) U.S. Cl. ........................................ 502/439; 502/524
(58) Field of Search .................................. 502/524, 439

(56) References Cited

U.S. PATENT DOCUMENTS

| 3,880,776 | A | | 4/1975 | Box, Jr. et al. ............. 252/466 |
| 3,923,690 | A | * | 12/1975 | Vogt et al. |
| 4,343,724 | A | * | 8/1982 | Antos |
| 4,456,703 | A | * | 6/1984 | Aldridge et al. |
| 4,484,015 | A | | 11/1984 | Johnson et al. ............. 585/262 |
| 4,565,803 | A | | 1/1986 | Schoenthal et al. ......... 502/303 |
| 4,692,430 | A | * | 9/1987 | Welch |
| 4,772,750 | A | * | 9/1988 | Habermann |
| 4,985,387 | A | * | 1/1991 | Prigent et al. |
| 5,036,032 | A | * | 7/1991 | Iglesia et al. |
| 5,073,661 | A | * | 12/1991 | Scheffer et al. |
| 5,095,166 | A | * | 3/1992 | Forschner et al. |
| 5,219,816 | A | * | 6/1993 | Zhou et al. |
| 5,475,173 | A | | 12/1995 | Cheung et al. ............. 585/259 |
| 5,482,615 | A | | 1/1996 | Meitzner et al. ............ 208/139 |
| 5,489,565 | A | | 2/1996 | Cheung et al. ............. 502/325 |
| 5,536,695 | A | * | 7/1996 | Blejean et al. |
| 5,688,984 | A | | 11/1997 | Ohdan et al. ............... 558/277 |
| 5,753,583 | A | | 5/1998 | Heineke et al. ............. 585/326 |
| 5,866,735 | A | | 2/1999 | Cheung et al. ............. 585/273 |

* cited by examiner

Primary Examiner—Steven P. Griffin
Assistant Examiner—Christina Ildebrando
(74) Attorney, Agent, or Firm—H. N. Sean Sun

(57) ABSTRACT

A process of making a metal aluminate catalyst support by incorporating, preferably impregnating, alumina, preferably gamma alumina, with a metal component to thereby provide a metal-incorporated alumina which is then calcined under a calcining condition to thereby provide a metal aluminate catalyst support. Such calcining condition includes a temperature in the range of from about 600° C. to about 1350° C. Preferably the metal component has been melted under a melting condition to thereby provide a melted metal component.

41 Claims, No Drawings

PROCESS FOR PRODUCING A METAL ALUMINATE CATALYST SUPPORT

BACKGROUND OF THE INVENTION

This invention relates to a metal aluminate catalyst support and to a process of making such metal aluminate catalyst support.

It is known that catalysts having a metal aluminate support, such as a zinc aluminate support, can be used in the selective hydrogenation and dehydrogenation of hydrocarbons. In general, prior art processes to produce such metal aluminate support typically involve physically mixing a metal component, such as metal oxide, and an aluminum component, such as aluminum oxide, followed by drying and calcining to produce a metal aluminate catalyst support containing a metal aluminate such as a zinc aluminate, also referred to as a zinc spinel. Another common process of producing such metal aluminate catalyst support comprises coprecipitating an aqueous solution of a metal component, such as metal nitrate, and an aqueous solution of an aluminum component, such as aluminum nitrate, followed by drying and calcining such as the process disclosed in U.S. Pat. No. 3,641,182. However, these processes are costly and time-consuming. Consequently, a process to produce a metal aluminate catalyst support which does not involve physical mixing or coprecipitation would be of significant contribution to the art and to the economy.

SUMMARY OF THE INVENTION

An object of the present invention is to provide a process to produce a metal aluminate catalyst support that does not involve the physical mixing of a metal component and an aluminum component.

Another object of the present invention is to provide a process to produce a metal aluminate catalyst support that does not involve a coprecipitation of a metal component and an aluminum component.

Yet another object of the present invention is to provide a process to produce a metal aluminate catalyst support that is economically cheaper and easier than prior art methods.

In accordance with one aspect of the present invention, there is provided a process to produce a metal aluminate catalyst support. Such process comprises incorporating alumina with a metal component, preferably impregnating alumina with a melted metal component, to thereby provide a metal-incorporated alumina followed by drying and high temperature calcining to thereby provide a metal aluminate catalyst support. Such metal aluminate catalyst support contains a metal aluminate similar to those metal aluminate catalyst supports produced by physically mixing a metal component, such as metal oxide, and an aluminum component, such as aluminum oxide, or coprecipitating a metal-containing solution and an aluminum-containing solution, followed by drying and calcining.

In accordance with another aspect of the invention, there is provided a metal aluminate catalyst support prepared by a process comprising impregnating alumina with a metal component, preferably a melted metal component, followed by drying and high temperature calcining.

In accordance with yet another aspect of the invention, there is provided a metal aluminate catalyst support.

Other objects and advantages of the invention will become more apparent from the detailed description of the invention and the appended claims.

DETAILED DESCRIPTION OF THE INVENTION

It has been discovered that a metal aluminate catalyst support can be readily prepared from existing pre-formed alumina (also referred to as aluminum oxide) tablets, pellets, extrudates, spheres, and the like and combinations thereof by incorporating, preferably impregnating, such alumina with a metal component, preferably a melted metal component, followed by drying and then high temperature calcining. The resulting metal aluminate catalyst support contains a metal aluminate such as a zinc aluminate, also referred to as a zinc spinel, which is readily formed on the outside of, i.e., on the surface of, the alumina. Such metal aluminate catalyst support preparation is considerably cheaper and easier than preparation techniques involving physically mixing a metal component, such as metal oxide, and an aluminum component, such as aluminum oxide, or coprecipitating metal-containing and aluminum-containing solutions, followed by extended calcining and then pelletizing and/or extruding to form catalyst pellets or granules.

Generally, the alumina used in producing the metal aluminate catalyst support according to the inventive process (es) disclosed herein can be any suitable alumina such as, but not limited to, alpha alumina, beta alumina, delta alumina, eta alumina, gamma alumina, and the like and combinations thereof. Preferably, such alumina is gamma alumina. The alumina can also contain minor amounts of other ingredients, such as, for example, silica in a range of from about 1 weight percent silica to about 10 weight percent silica, which do not adversely affect the quality of the metal aluminate catalyst support. Generally, it is desirable to have an essentially pure alumina, preferably essentially pure gamma alumina, as a starting material for preparing the metal aluminate catalyst support. The starting alumina can be made by any manner or method(s) known in the art. As an example, a suitable commercially available starting alumina for use in preparing the metal aluminate catalyst support according to the inventive process(es) described herein are gamma alumina tablets or extrudate pellets or spheres such as those manufactured by UOP Inc., McCook, Ill., and Engelhard Company, Elyria, Ohio.

Alumina suitable for use in the inventive process(es) described herein can also be characterized by having the following characteristics. Generally, the surface area of the alumina is in the range of from about 5 $m^2/g$ (measured by the Brunauer, Emmett, Teller method, i.e., BET method) to about 400 $m^2/g$, preferably in the range of from about 10 $m^2/g$ to about 300 $m^2/g$ and, most preferably, in the range of from 50 $m^2/g$ to 200 $m^2/g$.

The pore volume of the alumina is generally in the range of from about 0.05 mL/g to about 2 mL/g, preferably in the range of from about 0.10 mL/g to about 1.5 mL/g and, most preferably, in the range of from 0.20 mL/g to 1 mL/g.

The average pore diameter of the alumina is generally in the range of from about 5 angstroms to about 600 angstroms, preferably in the range of from about 10 angstroms to about 500 angstroms and, most preferably, in the range of from 25 angstroms to 200 angstroms.

The alumina can have any suitable shape or form. Preferably such alumina is in the form of tablets, pellets, extrudates, spheres, and the like and combinations thereof. The alumina generally has a particle size in the range of from about 0.5 millimeters (mm) to about 10 mm, preferably in the range of from about 1 mm to about 8 mm and, most preferably, in the range of from 1 mm to 6 mm.

Any metal component which can form a spinel when utilized in accordance with the inventive process(es) disclosed herein can be used. Examples of a potentially suitable metal component for incorporating the metal of such metal component, preferably impregnating the metal of such metal component into, onto, or with the alumina to thereby provide a metal-incorporated alumina include, but are not limited to, a zinc component, a magnesium component, a calcium component, a barium component, a beryllium component, a cobalt component, an iron component, a manganese component, a strontium component, a lithium component, a potassium component, and the like and combinations thereof. Preferable examples of a potentially suitable metal component for incorporating the metal of such metal component, preferably impregnating the metal of such metal component into, onto, or with the alumina to thereby provide a metal-incorporated alumina include, but are not limited to, a zinc component, a magnesium component, a calcium component, and the like and combinations thereof. More preferably, such metal component is a zinc component.

Examples of a potentially suitable zinc component for incorporating zinc, preferably impregnating zinc into, onto, or with the alumina include, but are not limited to, zinc nitrate hexahydrate, zinc nitrate, hydrated zinc nitrate, zinc chloride, zinc acetate dihydrate, zinc acetylacetonate hydrate, zinc carbonate hydroxide monohydrate, zinc perchlorate hexahydrate, hydrated zinc sulfate, zinc sulfate monohydrate, zinc sulfate heptahydrate, and the like and combinations thereof. The preferred zinc component for incorporating zinc, preferably impregnating zinc into, onto, or with the alumina is hydrated zinc nitrate. The most preferred zinc component for incorporating zinc, preferably impregnating zinc into, onto, or with the alumina is zinc nitrate hexahydrate.

Examples of a potentially suitable magnesium component for incorporating magnesium, preferably impregnating magnesium into, onto, or with the alumina include, but are not limited to, magnesium nitrate hexahydrate, magnesium nitrate, hydrated magnesium nitrate, magnesium chloride, hydrated magnesium chloride, magnesium chloride hexahydrate, magnesium acetate tetrahydrate, magnesium acetylacetonate dihydrate, magnesium carbonate hydroxide pentahydrate, magnesium perchlorate, magnesium perchlorate hexahydrate, magnesium sulfate, magnesium sulfate heptahydrate, magnesium sulfate monohydrate, and the like and combinations thereof. The preferred magnesium component for incorporating magnesium, preferably impregnating magnesium into, onto, or with the alumina is hydrated magnesium nitrate. The most preferred magnesium component for incorporating magnesium, preferably impregnating magnesium into, onto, or with the alumina is magnesium nitrate hexahydrate.

Examples of a potentially suitable calcium component for incorporating calcium, preferably impregnating calcium into, onto, or with the alumina include, but are not limited to, calcium nitrate tetrahydrate, calcium nitrate, hydrated calcium nitrate, calcium chloride, hydrated calcium chloride, calcium chloride dihydrate, calcium chloride hexahydrate, calcium chloride hydrate, calcium acetate hydrate, calcium acetate monohydrate, calcium acetylacetonate hydrate, calcium perchlorate tetrahydrate, calcium sulfate, calcium sulfate dihydrate, calcium sulfate hemihydrate, and the like and combinations thereof. The preferred calcium component for incorporating calcium, preferably impregnating calcium into, onto, or with the alumina is hydrated calcium nitrate. The most preferred calcium component for incorporating calcium, preferably impregnating calcium into, onto, or with the alumina is calcium nitrate tetrahydrate.

Examples of a potentially suitable barium component for incorporating barium, preferably impregnating barium into, onto, or with the alumina include, but are not limited to, barium nitrate, hydrated barium nitrate, barium chloride, hydrated barium chloride, barium chloride dihydrate, barium acetate, barium acetylacetonate hydrate, barium carbonate, barium perchlorate, barium perchlorate trihydrate, barium sulfate, and the like and combinations thereof. The preferred barium component for incorporating barium, preferably impregnating barium into, onto, or with the alumina is hydrated barium nitrate. The most preferred barium component for incorporating barium, preferably impregnating barium into, onto, or with the alumina is barium nitrate.

Examples of a potentially suitable beryllium component for incorporating beryllium, preferably impregnating beryllium into, onto, or with the alumina include, but are not limited to, beryllium nitrate trihydrate, hydrated beryllium nitrate, beryllium chloride, hydrated beryllium sulfate, beryllium sulfate tetrahydrate, and the like and combinations thereof. The preferred beryllium component for incorporating beryllium, preferably impregnating beryllium into, onto, or with the alumina is hydrated beryllium nitrate. The most preferred beryllium component for incorporating beryllium, preferably impregnating beryllium into, onto, or with the alumina is beryllium nitrate trihydrate.

Examples of a potentially suitable cobalt component for incorporating cobalt, preferably impregnating cobalt into, onto, or with the alumina include, but are not limited to, cobalt nitrate hexahydrate, hydrated cobalt nitrate, cobalt chloride, hydrated cobalt chloride, cobalt chloride hexahydrate, cobalt chloride hydrate, cobalt acetate tetrahydrate, cobalt acetylacetonate, cobalt acetylacetonate hydrate, cobalt carbonate hydrate, cobalt perchlorate hexahydrate, hydrated cobalt sulfate, cobalt sulfate hydrate, and the like and combinations thereof. The preferred cobalt component for incorporating cobalt, preferably impregnating cobalt into, onto, or with the alumina is hydrated cobalt nitrate. The most preferred cobalt component for incorporating cobalt, preferably impregnating cobalt into, onto, or with the alumina is cobalt nitrate hexahydrate.

Examples of a potentially suitable iron component for incorporating iron, preferably impregnating iron into, onto, or with the alumina include, but are not limited to, iron nitrate nonahydrate, hydrated iron nitrate, iron chloride, hydrated iron chloride, iron chloride tetrahydrate, iron chloride hexahydrate, iron acetate, iron acetylacetonate, iron perchlorate hexahydrate, hydrated iron sulfate, iron sulfate heptahydrate, and the like and combinations thereof. The preferred iron component for incorporating iron, preferably impregnating iron into, onto, or with the alumina is hydrated iron nitrate. The most preferred iron component for incorporating iron, preferably impregnating iron into, onto, or with the alumina is iron nitrate nonahydrate.

Examples of a potentially suitable manganese component for incorporating manganese, preferably impregnating manganese into, onto, or with the alumina include, but are not limited to, manganese nitrate hexahydrate, hydrated manganese nitrate, manganese nitrate hydrate, manganese chloride, hydrated manganese chloride, manganese chloride tetrahydrate, manganese acetate dihydrate, manganese acetate tetrahydrate, manganese acetylacetonate, manganese carbonate, manganese perchlorate hexahydrate, hydrated manganese sulfate, manganese sulfate monohydrate, and the like and combinations thereof. The preferred manganese component for incorporating manganese, preferably impregnating manganese into, onto, or with the alumina is hydrated manganese nitrate. The most preferred manganese component for incorporating manganese, preferably impregnating manganese into, onto, or with the alumina is manganese nitrate hexahydrate.

Examples of a potentially suitable strontium component for incorporating strontium, preferably impregnating strontium into, onto, or with the alumina include, but are not limited to, strontium nitrate, hydrated strontium nitrate, strontium chloride, hydrated strontium chloride, strontium chloride hexahydrate, strontium acetate, strontium acetylacetonate, strontium carbonate, strontium perchlorate hydrate, hydrated strontium sulfate, strontium sulfate, and the like and combinations thereof. The preferred strontium component for incorporating strontium, preferably impregnating strontium into, onto, or with the alumina is strontium nitrate.

Examples of a potentially suitable lithium component for incorporating lithium, preferably impregnating lithium into, onto, or with the alumina include, but are not limited to, lithium nitrate, hydrated lithium nitrate, lithium chloride, hydrated lithium chloride, lithium chloride hydrate, lithium acetate dihydrate, lithium acetylacetonate, lithium perchlorate, lithium perchlorate trihydrate, lithium sulfate, lithium sulfate monohydrate, and the like and combinations thereof. The preferred lithium component for incorporating lithium, preferably impregnating lithium into, onto, or with the alumina is lithium nitrate.

Examples of a potentially suitable potassium component for incorporating potassium, preferably impregnating potassium into, onto, or with the alumina include, but are not limited to, potassium nitrate, hydrated potassium nitrate, potassium chloride, hydrated potassium chloride, potassium acetylacetonate hemihydrate, potassium carbonate sesquihydrate, potassium perchlorate, potassium sulfate, and the like and combinations thereof. The preferred potassium component for incorporating potassium, preferably impregnating potassium into, onto, or with the alumina is potassium nitrate.

The metal component(s) may be incorporated into, onto, or with the alumina by any suitable means or method(s) for incorporating the metal of such metal component(s) into, onto, or with a substrate material, such as alumina, which results in the formation of a metal-incorporated alumina which can then be dried and calcined to thereby provide a metal aluminate catalyst support. Examples of means or method(s) for incorporating include, but are not limited to, impregnating, soaking, spraying, and the like and combinations thereof. A preferred method of incorporating is impregnating using any standard incipient wetness impregnation technique (i.e., essentially completely filling the pores of the substrate material with a solution of the incorporating elements) for impregnating an alumina substrate with a metal component. A preferred method uses an impregnating solution comprising the desirable concentration of metal component so as to ultimately provide a metal-incorporated, preferably metal-impregnated, alumina which can then be subjected to drying and high temperature calcining to produce a metal aluminate catalyst support.

It can be desirable to use an aqueous solution of a metal component for the impregnation of the alumina. A preferred impregnating solution comprises an aqueous solution formed by dissolving a metal component, preferably such metal component is in the form of a metal salt, such as, but not limited to, a metal chloride, a metal nitrate, a metal sulfate, and the like and combinations thereof, in a solvent, such as, but not limited to, water, alcohols, esters, ethers, ketones, and the like and combinations thereof.

A preferred impregnating solution is formed by dissolving a metal component (such as zinc nitrate hexahydrate, magnesium nitrate hexahydrate, calcium nitrate tetrahydrate, barium nitrate, beryllium nitrate trihydrate, cobalt nitrate hexahydrate, iron nitrate nonahydrate, manganese nitrate hexahydrate, strontium nitrate, lithium nitrate, potassium nitrate, preferably, zinc nitrate hexahydrate) in water. It is acceptable to use somewhat of an acidic solution to aid in the dissolution of the metal component. It is preferred for the alumina to be impregnated with a zinc component by use of a solution containing zinc nitrate hexahydrate dissolved in water. In addition, magnesium nitrate hexahydrate or calcium nitrate tetrahydrate or barium nitrate or beryllium nitrate trihydrate or cobalt nitrate hexahydrate or iron nitrate nonahydrate or manganese nitrate hexahydrate or strontium nitrate or lithium nitrate or potassium nitrate can be used in place of zinc nitrate hexahydrate to impregnate the alumina with the metal of the respective metal component(s).

A more preferred method for incorporating a metal of a metal component into, onto, or with the alumina is to impregnate such alumina with a metal component which has been melted under a melting condition as described herein. Preferably such metal component is in the form of a metal salt, such as, but not limited to, a metal chloride, a metal nitrate, a metal sulfate, and the like and combinations thereof (such as, but not limited to, zinc nitrate hexahydrate, magnesium nitrate hexahydrate, calcium nitrate tetrahydrate, barium nitrate, beryllium nitrate trihydrate, cobalt nitrate hexahydrate, iron nitrate nonahydrate, manganese nitrate hexahydrate, strontium nitrate, lithium nitrate, potassium nitrate, and the like and combinations thereof, preferably, zinc nitrate hexahydrate). Addition of small amounts of an aqueous medium such as water to the metal component can be used to assist in the melting of such metal component.

Such melting condition includes a temperature below the decomposition temperature of the metal component for a time period and at a pressure that provides for a melted metal component, preferably a pourable melted metal component. The term "decomposition temperature" refers to the temperature at which the metal component is no longer soluble and is no longer suitable for incorporating, preferably impregnating, the metal of such metal component into, onto, or with alumina according to the inventive process(es) disclosed herein. The term "pourable melted metal component" refers to a metal component that has been subjected to a melting condition and has become viscous enough to pour.

The temperature below the decomposition temperature of the metal component varies depending on the metal component but such temperature should be such as to provide a melted metal component. Such temperature is generally in the range of from about 25° C. to about 160° C., preferably in the range of from about 30° C. to about 150° C., more preferably in the range of from about 35° C. to about 140° C. and, most preferably, in the range of from 35° C. to 130° C.

Such melting condition can include a time period generally in the range of from about 1 minute to about 2 hours, preferably in the range of from about 5 minutes to about 1.5 hours and, most preferably, in the range of from 5 minutes to 1 hour. Such melting condition can include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained.

The thus-melted metal component is then used to incorporate, preferably impregnate, the metal of such melted metal component into, onto, or with the alumina. The metal of such melted metal component is incorporated, preferably impregnated, into, onto, or with the alumina by adding such melted metal component to the alumina by pouring such melted metal component onto the surface of the alumina by any manner or method(s) which results in substantially all the surface area of the alumina being coated with the melted metal component. Preferably, such melted metal component is poured over the surface of the alumina while the alumina is under constant stirring or tumbling.

It can be desirable to pre-heat the alumina under a heating condition before such melted metal component is poured over the surface of the alumina. Such heating condition can include a temperature generally in the range of from about 80° C. to about 150° C., preferably in the range of from about 85° C. to about 140° C. and, most preferably, in the range of from 90° C. to 130° C. Such heating condition can include a time period generally in the range of from about 1 minute to about 2 hours, preferably in the range of from about 5 minutes to about 1.5 hours and, most preferably, in the range of from 5 minutes to 1 hour. Such heating condition can include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained. The metal-incorporated, preferably metal-impregnated, alumina can be further heated near the melting point of the metal component for a time period in the range of from about 0.5 hour to about 15 hours, preferably in the range of from about 1 hour to about 8 hours and, most preferably, in the range of from 1 hour to 5 hours.

In a most preferred method, melted zinc nitrate hexahydrate is used to incorporate, preferably impregnate, the zinc of such melted zinc nitrate hexahydrate into, onto, or with the alumina. The zinc of such melted zinc nitrate hexahydrate is incorporated, preferably impregnated, into, onto, or with the alumina by adding such melted zinc nitrate hexahydrate to the alumina by pouring such melted zinc nitrate hexahydrate onto the surface of the alumina by any manner or method(s) which results in substantially all the surface area of the alumina being coated with the melted zinc nitrate hexahydrate. Preferably, such melted zinc nitrate hexahydrate is poured over the surface of the alumina while the alumina is under constant stirring or tumbling. In addition, magnesium nitrate hexahydrate or calcium nitrate tetrahydrate or barium nitrate or beryllium nitrate trihydrate or cobalt nitrate hexahydrate or iron nitrate nonahydrate or manganese nitrate hexahydrate or strontium nitrate or lithium nitrate or potassium nitrate can be used in place of zinc nitrate hexahydrate to incorporate, preferably impregnate, the metal of such metal component(s) into, onto, or with the alumina in the same above-described manner as for incorporating, preferably impregnating, the zinc of such zinc nitrate hexahydrate.

Generally, the amount of metal component, preferably zinc component, incorporated, preferably impregnated, into, onto, or with the alumina is an amount which provides, after the metal-incorporated alumina has been dried and calcined according to the inventive process(es) disclosed herein, a metal aluminate catalyst support having an amount of metal aluminate generally in the range of from about 1 weight percent of the total weight of the metal aluminate catalyst support to about 100 weight percent. Preferably the amount of metal in, on, or with the metal-incorporated alumina is in an amount which provides a metal aluminate catalyst support having an amount of metal aluminate in the range of from about 15 weight percent of the total weight of the metal aluminate catalyst support to about 75 weight percent and, most preferably, in the range of from 25 weight percent to 65 weight percent.

The metal-incorporated alumina can then be dried under a drying condition. Generally, such drying condition can include a temperature in the range of from about 80° C. to about 140° C., preferably in the range of from about 90° C. to about 130° C. and, most preferably, in the range of from 100° C. to 120 ° C. Such drying condition can also include a time period for drying the metal-incorporated alumina generally in the range of from about 0.5 hour to about 60 hours, preferably in the range of from about 1 hour to about 40 hours and, most preferably, in the range of from 1.5 hours to 20 hours to produce a dried metal-incorporated alumina. Such drying condition can also include a pressure generally in the range of from about atmospheric (i.e., about 14.7 pounds per square inch absolute) to about 150 pounds per square inch absolute (psia), preferably in the range of from about atmospheric to about 100 psia, most preferably about atmospheric, so long as the desired temperature can be maintained. Any drying method(s) known to one skilled in the art such as, for example, air drying, heat drying, and the like and combinations thereof can be used.

The thus-dried metal-incorporated alumina can then be calcined under a calcining condition to thereby provide a metal aluminate catalyst support. The calcining condition is important in providing a metal aluminate catalyst support having physical characteristics, such as, for example, a surface area, pore volume, average pore diameter, and crystalline domain size, in the ranges as disclosed herein, suitable for using such metal aluminate catalyst support as a support for hydrogenation and dehydrogenation catalysts.

Generally, such calcining condition can include a temperature in the range of from about 600° C. to about 1350° C., preferably in the range of from about 675° C. to about 1300° C., more preferably, in the range of from about 800° C. to about 1250° C. and, most preferably, in the range of from 900° C. to 1200° C. Such calcining condition can also include a pressure, generally in the range of from about 7 pounds per square inch absolute (psia) to about 750 psia, preferably in the range of from about 7 psia to about 450 psia and, most preferably, in the range of from 7 psia to 150 psia, and a time period in the range of from about 1 hour to about 60 hours, preferably for a time period in the range of from about 2 hours to about 20 hours and, most preferably, for a time period in the range of from 3 hours to 15 hours.

Upon calcination of the dried metal-incorporated alumina, a metal aluminate will form in, on the outside surface of, or on, but not limited to, the surface of, the alumina to thereby provide a metal aluminate catalyst support of the invention. Examples of a suitable metal aluminate include, but are not limited to, a zinc aluminate, also referred to as a zinc spinel, a magnesium aluminate, also referred to as a magnesium spinel, a calcium aluminate, also referred to as a calcium spinel, a barium aluminate, also referred to as a barium spinel, a beryllium aluminate, also referred to as a beryllium spinel, a cobalt aluminate, also referred to as a cobalt spinel, an iron aluminate, also referred to as an iron spinel, a manganese aluminate, also referred to as a manganese spinel, a strontium aluminate, also referred to as a strontium spinel, a lithium aluminate, also referred to as a lithium spinel, a potassium aluminate, also referred to as a potassium spinel, and the like and combinations thereof. A preferred metal aluminate is selected from the group consisting of a zinc aluminate, also referred to as a zinc spinel, a magnesium aluminate, also referred to as a magnesium spinel, a calcium aluminate, also referred to as a calcium spinel, and the like and combinations thereof. A more preferred metal aluminate is a zinc aluminate, also referred to as a zinc spinel.

The amount of metal aluminate of the metal aluminate catalyst support, preferably zinc aluminate catalyst support, is generally in the range of from about 1 weight percent based on the total weight of the metal aluminate catalyst support to about 100 weight percent. Preferably, the amount of metal aluminate of the metal aluminate catalyst support of the invention is in the range of from about 15 weight percent based on the total weight of the metal aluminate catalyst support to about 75 weight percent and, most preferably, in the range of from 25 weight percent to 65 weight percent.

The amount of alpha alumina of the metal aluminate catalyst support, preferably zinc aluminate catalyst support, is generally in the range of from about 0 weight percent based on the total weight of the metal aluminate catalyst support to about 99 weight percent, preferably in the range of from about 10 weight percent to about 85 weight percent and, most preferably, in the range of from 15 weight percent to 70 weight percent. The crystalline domain size of the alpha alumina of the metal aluminate catalyst support is generally in the range of from about 25 angstroms to about 3000 angstroms, preferably in the range of from about 25 angstroms to about 2500 angstroms and, most preferably, in the range of from 50 angstroms to 2000 angstroms. The "crystalline domain size" is determined from the line broadening of the X-ray diffraction profile.

The amount of gamma alumina of the metal aluminate catalyst support, preferably zinc aluminate catalyst support, generally ranges upwardly from about 0 weight percent based on the total weight of the metal aluminate catalyst support to about 60 weight percent, preferably in the range of from about 0 weight percent to about 50 weight percent and, most preferably, in the range of from 0 weight percent to 40 weight percent.

Generally, the surface area of the metal aluminate catalyst support, preferably zinc aluminate catalyst support, is in the range of from about 1 $m^2/g$ (measured by the Brunauer, Emmett, Teller method, i.e. BET method) to about 200 $m^2/g$, preferably in the range of from about 1 $m^2/g$ to about 150 $m^2/g$, more preferably in the range of from about 5 $m^2/g$ to about 125 $m^2/g$ and, most preferably, in the range of from 10 $m^2/g$ to 80 $m^2/g$.

The pore volume of the metal aluminate catalyst support, preferably zinc aluminate catalyst support, is generally in the range of from about 0.05 mL/g to about 2 mL/g, preferably in the range of from about 0.10 mL/g to about 1.5 mL/g and, most preferably, in the range of from 0.10 mL/g to 1 mL/g.

The average pore diameter of the metal aluminate catalyst support, preferably zinc aluminate catalyst support, is generally in the range of from about 50 angstroms to about 1000 angstroms, preferably in the range of from about 50 angstroms to about 750 angstroms and, most preferably, in the range of from 50 angstroms to 450 angstroms.

The crystalline domain size of the metal aluminate, preferably zinc aluminate, of the metal aluminate catalyst support is generally in the range of from about 25 angstroms to about 1750 angstroms, preferably in the range of from about 25 angstroms to about 1500 angstroms, more preferably in the range of from about 25 angstroms to about 1250 angstroms and, most preferably, in the range of from 25 angstroms to 1000 angstroms.

The particle size of the metal aluminate catalyst support, preferably zinc aluminate catalyst support, is generally in the range of from about 0.5 millimeter (mm) to about 10 mm, preferably in the range of from about 1 mm to about 8 mm and, most preferably, in the range of from 1 mm to 6 mm.

The metal aluminate catalyst support, preferably zinc aluminate catalyst support, prepared by the inventive process(es) described herein can be used as a catalyst support in the selective hydrogenation processes described in, for example, U.S. Pat. Nos. 5,510,550; 5,475,173; and 5,583,274. The metal aluminate catalyst support, preferably zinc aluminate catalyst support, prepared by the inventive process described herein can also be used as a catalyst support for a dehydrogenation process such as the process described in, for example, U.S. Pat. No. 3,641,182.

The following examples are presented to further illustrate the invention and are not to be considered as unduly limiting the scope of the invention.

EXAMPLE I

This example illustrates the preparation of several zinc aluminate catalyst supports.

Support A (Control) was a commercially available gamma alumina provided by UOP Inc., McCook, Ill., obtained as pre-calcined tablets having a diameter of about ⅛ inch which was calcined in air at a temperature of about 900° C. at a pressure of about atmospheric (i.e., about 14.7 psia) for about 5 hours.

Support B (Control) was a commercially available gamma alumina provided by UOP Inc., McCook, Ill., obtained as pre-calcined tablets having a diameter of about ⅛ inch which was calcined in air at a temperature of about 1100° C. at a pressure of about atmospheric (i.e., about 14.7 psia) for about 4 hours.

Support C (Invention) was prepared as follows. A 75.6 gram quantity of commercially available gamma alumina (provided by Englehard Company, Elyria, Ohio, obtained as rotoform spheres having a diameter of about ⅛ inch) was placed in a drying oven at 120° C. for about 1 hour. The thus-heated gamma alumina was then impregnated with about 66.9 grams of zinc nitrate hexahydrate $(Zn(NO_3)_2·6H_2O)$ which had been melted in a drying oven at a temperature of about 120° C. at a pressure of about atmospheric (i.e., about 14.7 psia) for about one hour. The impregnation of the gamma alumina rotoform spheres with the melted zinc nitrate hexahydrate was conducted by adding the melted zinc nitrate hexahydrate dropwise to the gamma alumina rotoform spheres over a 30 minute period using a 5 mL pipette. The gamma alumina rotoform spheres were continuously stirred during the addition of the melted zinc nitrate hexahydrate. When finished, the thus-zinc-incorporated alumina was placed in a drying oven at 120° C. overnight (approximately 16 hours). The thus-dried zinc-incorporated alumina was then placed in a quartz calcining tube and the temperature was slowly increased to 110° C. and maintained at 110° C. for a one-hour period. The calcining tube was constantly purged with air during calcination. The temperature was then increased to 300° C. and maintained at 300° C. for three hours as NO, gas liberation was observed above 250° C. The temperature was increased to 350° C. and maintained at 350° C. overnight (approximately 16 hours) and then increased to 500° C. and maintained at 500° C. for nine hours. The calcining tube was then allowed to cool for about 48 hours and then the temperature was increased to 120° C. and maintained at 120° C. overnight (approximately 16 hours). The temperature was then increased to 500° C. and maintained at 500° C. for 5 hours. The temperature was then increased to 600°

C. and maintained at 600° C. for 1.5 hours. The calcining tube was then allowed to cool for a time period of about 2 hours to thereby provide a zinc aluminate catalyst support.

Support D (Invention) was prepared in the same manner as the above-described Invention Support C with the exception that after increasing the temperature to 600° C. and maintaining at 600° C. for 1.5 hours, the temperature was then increased to 700° C. and maintained at 700° C. for 1 hour. The calcining tube was then allowed to cool for a time period of about 2 hours to thereby provide a zinc aluminate catalyst support.

Support E (Invention) was prepared in the same manner as the above-described Invention Support D with the exception that after increasing the temperature to 700° C. and maintaining at 700° C. for 1 hour, the temperature was then increased to 820° C. and maintained at 820° C. for 1.5 hours. The calcining tube was then allowed to cool for a time period of about 2 hours to thereby provide a zinc aluminate catalyst support.

Support F (Invention) was prepared as follows. A 20 gram quantity of commercially available gamma alumina (provided by UOP Inc., McCook, Ill., obtained as pre-calcined tablets having a diameter of about ⅛ inch) was placed in a drying oven at 120° C. for about 1 hour. The thus-heated gamma alumina was then impregnated with about 33 grams of zinc nitrate hexahydrate ($Zn(NO_3)_2 \cdot 6H_2O$) which had been melted at a temperature of about 120° C at a pressure of about atmospheric (i.e., about 14.7 psia) for about 30 minutes. The impregnation of the gamma alumina pellets with the melted zinc nitrate hexahydrate was conducted by adding the melted zinc nitrate hexahydrate dropwise to the gamma alumina pellets over a 30 minute period using a 5 mL pipette. The gamma alumina pellets were continuously stirred during the addition of the melted zinc nitrate hexahydrate. When finished, the thus-zinc-incorporated alumina was placed in a drying oven at 120° C. for about 15 hours. The thus-dried zinc-incorporated alumina was then placed in a quartz calcining tube and calcined in air at 900° C. at a pressure of about atmospheric (i.e., about 14.7 psia) for about 5 hours. The calcining tube was then allowed to cool for a time period of about 2 hours to thereby provide a zinc aluminate catalyst support.

Support G (Invention) was prepared in the same manner as the above-described Invention Support F with the exception that the calcining was conducted at a temperature of about 1100° C. for about 4 hours in lieu of a calcining temperature of about 900° C. for about 5 hours.

Support H (Invention) was prepared as follows. A 150 gram quantity of commercially available gamma alumina (provided by Englehard Company, Elyria, Ohio, obtained as pre-calcined tablets having a diameter of about ⅛ inch) was placed in a drying oven at 130° C. for about 1 hour. The thus-heated gamma alumina was then impregnated with about 136 grams of zinc nitrate hexahydrate ($Zn(NO_3)_2 \cdot 6H_2O$) which had been melted in a drying oven at a temperature of about 130° C. at a pressure of about atmospheric (i.e., about 14.7 psia) for about one hour. The impregnation of the gamma alumina pellets with the melted zinc nitrate hexahydrate was conducted by adding the melted zinc nitrate hexahydrate dropwise to the gamma alumina pellets over a 30 minute period using a 5 mL pipette. The gamma alumina pellets were continuously stirred during the addition of the melted zinc nitrate hexahydrate. When finished, the thus-zinc-incorporated alumina was placed in a drying oven at 130° C. for about 48 hours. The thus-dried zinc-incorporated alumina was then placed in a quartz calcining tube and the temperature was slowly increased to 300° C. over a three-hour period under an air purge as $NO_x$ gas liberation was observed. The calcining tube was constantly purged with air during calcination. The temperature was maintained at 300° C. for 3 hours and then increased to 400° C. The 400° C. temperature was maintained overnight (approximately 16 hours) and then increased to 1100° C. over two hours and then maintained at 1100° C. for 7 hours. The furnace providing heat to the calcining tube was then turned off overnight (approximately 16 hours). The calcining tube was then heated to 1100° C. over 3 hours and then maintained at 1100° C. for 4 hours. The calcining tube was then allowed to cool for a time period of about 2 hours to thereby provide a zinc aluminate catalyst support.

Support I (Invention) was prepared as follows. A 75 gram quantity of commercially available gamma alumina (provided by Englehard Company, Elyria, Ohio, obtained as pre-calcined extrudate having a diameter of about 1/20 inch) was placed in a drying oven at 120° C. for about 1 hour. The thus-heated gamma alumina was then impregnated with about 69.3 grams of zinc nitrate hexahydrate ($Zn(NO_3)_2 \cdot 6H_2O$) which had been melted in a drying oven at a temperature of about 130° C. at a pressure of about atmospheric (i.e., about 14.7 psia) for about two hours. The impregnation of the gamma alumina pellets with the melted zinc nitrate hexahydrate was conducted by adding the melted zinc nitrate hexahydrate dropwise to the gamma alumina pellets over a 30 minute period using a 5 mL pipette. The gamma alumina pellets were continuously stirred during the addition of the melted zinc nitrate hexahydrate. When finished, the thus-zinc-incorporated alumina was placed in a drying oven at 130° C. for about 48 hours. The thus-dried zinc-incorporated alumina was then placed in a quartz calcining tube and the temperature was slowly increased to 350° C. over a three-hour period under an air purge as NO, gas liberation was observed above 250° C. The calcining tube was constantly purged with air during calcination. The temperature was maintained at 350° C. overnight (approximately 16 hours) and then increased to 1100° C. over three hours and then maintained at 1100° C. for 6 hours. The calcining tube was then allowed to cool for a time period of about 2 hours to thereby provide a zinc aluminate catalyst support.

Support J (Invention) was prepared in the same manner as the above-described Invention Support I with the exception that the thus-dried zinc-incorporated alumina was treated in air saturated with $H_2O$ (i.e., a steam atmosphere with a $H_2O$ flow rate of 20 mL/hr) for about 4 hours at a temperature of about 1100° C. in lieu of heating under an air purge.

Physical characteristics from analysis, such as surface area, pore volume, average pore diameter and crystalline domain size, for Supports A, B, C, D, E, F, G, H, I, and J are summarized below in Table I. The "crystalline domain size" was determined from the line broadening of the X-ray diffraction profile. In addition, the X-ray diffraction profile confirmed that Supports C, D, E, F, G, H, I, and J each had a zinc aluminate structure.

TABLE 1

| Support | Calcining Temperature (° C.) | Surface Area (m²/g) | Pore Volume (mL/g) | Average Pore Diameter (ang.) | Zinc Aluminate (ZnO.Al₂O₃) CDS (ang.) | alpha-Al₂O₃ CDS (ang.) | delta-Al₂O₃ CDS (ang.) | theta-Al₂O₃ CDS (ang.) | gamma-Al₂O₃ CDS (ang.) |
|---|---|---|---|---|---|---|---|---|---|
| A (Control) | 900 | 116 | 0.880 | 305 | ND | ND | ND | 95 | 60 |
| B (Control) | 1100 | 33 | 0.479 | 581 | ND | 680 | ND | 215 | ND |
| C (Invention) | 600 | 163 | 0.706 | 172 | 35 | ND | ND | 55 | ND |
| D (Invention) | 700 | 141 | 0.638 | 181 | 50 | ND | ND | 55 | ND |
| E (Invention) | 820 | 128 | 0.696 | 217 | 65 | ND | ND | 65 | ND |
| F (Invention) | 900 | 88 | 0.665 | 305 | 105 | ND | 110 | ND | 60 |
| G (Invention) | 1100 | 25 | 0.284 | 446 | 225 | 740 | 185 | ND | ND |
| H (Invention) | 1100 | 14 | 0.145 | 401 | 1075 | 465 | ND | ND | ND |
| I (Invention) | 1100 | 15 | 0.115 | 298 | 1295 | 335 | ND | ND | ND |
| J (Invention) | 1100 (steam) | 53 | 0.533 | 395 | 100 | >2000 | 150 | 300 | ND |

CDS = Crystalline Domain Size
ang. = angstroms
ND = Not Determined

The data in Table I demonstrate that the inventive process(es) described herein can be used to produce a metal aluminate catalyst support such as a zinc aluminate catalyst support. In addition, Invention Supports G, H and I exhibited significantly reduced surface areas (an important factor in making hydrogenation catalyst supports) compared to the Control Supports. Further, the data in Table I demonstrate that calcining below about 1100° C. resulted in a zinc aluminate catalyst support having a higher surface area than when calcined at about 1100° C. according to the inventive process(es) disclosed herein.

EXAMPLE II

This example illustrates the preparation of several magnesium aluminate catalyst supports and calcium aluminate catalyst supports.

Support K (Invention) was prepared as follows. A 90 gram quantity of commercially available gamma alumina (provided by LaRoche Industries Inc., Atlanta, Ga., obtained as pre-calcined tablets having a diameter of about ⅛ inch) was placed in a drying oven at 120° C. for about 30 minutes. The thus-heated gamma alumina was then impregnated with about 45 grams of magnesium nitrate hexahydrate (Mg(NO₃)₂·6H₂O) which, after the addition of 20 grams of deionized water, had been melted in a drying oven at a temperature of about 120° C. at a pressure of about atmospheric (i.e., about 14.7 psia) for about 30 minutes. The impregnation of the gamma alumina tablets with the melted magnesium nitrate was conducted by adding the melted magnesium nitrate hexahydrate dropwise to the gamma alumina tablets over a 30 minute period using a 5 mL pipette. The gamma alumina tablets were continuously stirred during the addition of the melted magnesium nitrate hexahydrate. The melted magnesium nitrate hexahydrate impregnating solution began to solidify during the addition of such magnesium nitrate hexahydrate to the gamma alumina tablets resulting in the melted magnesium nitrate solution having to be returned to the drying oven to be reheated at 120° C. for a period of about 3 minutes approximately every 10 minutes throughout the 30-minute period of impregnating the gamma alumina tablets.

When finished, the thus-magnesium-incorporated alumina was placed in a drying oven at 120° C. overnight (approximately 16 hours). The thus-dried magnesium-incorporated alumina was then placed in a quartz calcining tube and the temperature was slowly increased to 210° C. over a 3 hour period under an air purge. The temperature was then increased to 320 ° C. and maintained at 320° C. for 3 hours. The temperature was then increased to 360° C. and maintained at 360° C. for 3 hours. The temperature was then increased to 400° C. and maintained at 400° C. for 14.5 hours. The temperature was then increased to 500° C. and maintained at 500° C. for 2 hours. The temperature was then increased to 600° C. and maintained at 600° C. for 0.5 hour. During such heating NO, gas liberation was not observed.

The calcining tube was then allowed to cool overnight (approximately 16 hours). The magnesium-incorporated alumina was then transferred to a porcelain crucible and the temperature was then increased under a Programmed Temperature Ramp procedure as follows. The temperature was increased to 150° C. over a time period of about 0.2 hour and then maintained at 150° C. for about 1 hour. The temperature was then increased to 300° C. over a time period of about 0.5 hour and then maintained at 300° C. for a time period of about 5 hours. The temperature was then increased to 500° C. over a time period of about 1.7 hours and then maintained at 500 ° C. for a time period of about 5 hours. The temperature was then increased to 775° C. over a time period of about 2.3 hours and then maintained at 775° C. for a time period of about 4 hours. The temperature was then increased to 825° C. over a time period of about 0.8 hour and then maintained at 825 ° C. for a time period of about 4 hours. The temperature was then increased to 875° C. over a time period of about 0.8 hour and then maintained at 875 ° C. for a time period of about 6 hours. The temperature was then increased to 925 ° C. over a time period of about 0.8 hour and then maintained at 925 ° C. for a time period of about 4 hours. The temperature was then increased to 1130° C. over a time period of about 0.7 hour and then maintained at 1130° C. for a time period of about 10 hours. The porcelain crucible was then allowed to cool for a time period of about 2 hours to thereby provide a magnesium aluminate catalyst support.

The temperatures recited for the Programmed Temperature Ramp were the temperatures of the program. The actual temperatures achieved were slightly less than the programmed temperatures as follows: 150° C. programmed =148° C. actual; 300° C. programmed =296° C. actual; 500° C. programmed =494° C. actual; 775° C. programmed =758° C. actual; 825° C. programmed =805° C. actual; 875° C. programmed =854° C. actual; 925° C. programmed =902° C. actual; and 1130° C. programmed =1104° C. actual.

Support L (Invention) was prepared as follows. A 120 gram quantity of commercially available gamma alumina (provided by LaRoche Industries Inc., Atlanta, Ga., obtained as pre-calcined tablets having a diameter of about ⅛ inch) was placed in a drying oven at a temperature of about 120° C. for a period of about 15 minutes. The thus-heated gamma alumina was then impregnated with about 50 grams of calcium nitrate tetrahydrate ($Ca(NO_3)_2 \cdot 4H_2O$) which, after the addition of 25 grams of deionized water, had been melted in a drying oven at a temperature of about 120° C. at a pressure of about atmospheric (i.e., about 14.7 psia) for about 15 minutes. The impregnation of the gamma alumina tablets with the melted calcium nitrate tetrahydrate was conducted by adding the melted calcium nitrate tetrahydrate dropwise to the gamma alumina pellets over a 30 minute period using a 5 mL pipette. The gamma alumina pellets were continuously stirred during the addition of the melted calcium nitrate tetrahydrate. When finished, the thus-calcium-incorporated alumina was placed in a drying oven and heated at 120° C. overnight (approximately 16 hours).

The thus-dried calcium incorporated alumina was then placed in a quartz calcining tube and heated to 210° C. and maintained at 210° C. for a period of 3 hours. The temperature was then increased to 320° C. and maintained at 320° C. for a period of 3 hours. The temperature was then increased to 360° C. and maintained at 360° C. for a period of 3 hours. The temperature was then increased to 400° C. and maintained at 400° C. for a period of 14.5 hours. The temperature was then increased to 500° C. and maintained at 500° C. for a period of 2 hours. The temperature was then increased to 600° C. and maintained at 600° C. for a time period of 0.5 hour. The liberation of $NO_x$, gas was not observed. The calcining tube was then allowed to cool to room temperature (i.e., about 20° C. to about 25° C.). The calcium-incorporated alumina was then transferred to a porcelain crucible and the temperature was then increased under the same Programmed Temperature Ramp as recited herein for Invention Support K. After such Programmed Temperature Ramp heating, the porcelain crucible was then allowed to cool for a time period of about 2 hours to thereby provide a calcium aluminate catalyst support.

Support M (Invention) was prepared as follows. A 100 gram quantity of commercially available gamma alumina (provided by UOP Inc., McCook, Ill., obtained as pre-calcined tablets having a diameter of about ⅛ inch) was placed in a drying oven at a temperature of about 120° C. for a period of about 15 minutes. The thus-heated gamma alumina was then impregnated with about 60 grams of calcium nitrate tetrahydrate ($Ca(NO_3)_2 \cdot 4H_2O$) which, after the addition of 20 grams of deionized water, had been melted in a drying oven at a temperature of about 120° C. at a pressure of about atmospheric (i.e., about 14.7 psia) for about 15 minutes. The impregnation of the gamma alumina tablets with the melted calcium nitrate tetrahydrate was conducted by adding the melted calcium nitrate tetrahydrate dropwise to the gamma alumina tablets over a 30 minute period using a 5 mL pipette. The gamma alumina tablets were continuously stirred during the addition of the melted calcium nitrate tetrahydrate. When finished, the thus-calcium-incorporated alumina was placed in a drying oven and heated at 120° C. for 3 hours.

The thus-dried calcium incorporated alumina was then placed in a quartz calcining tube and heated to 120° C. for 3 hours. The temperature was then increased to 220° C. and maintained at 220° C. for a period of 3 hours. The temperature was then increased to 330° C. and maintained at 330° C. for a time period of 15 hours. The temperature was then increased to 400° C. and maintained at 400° C. for a period of 3 hours. The temperature was then increased to 500° C. and maintained at 500° C. for a period of 2 hours. The temperature was then increased to 600° C. and maintained at 600° C. for a period of about 1 hour. The liberation of $NO_x$, gas was not observed at 600° C. The calcining tube was then allowed to cool to room temperature (i.e., about 20° C. to about 25 ° C.). The calcium-incorporated alumina was then transferred to a porcelain crucible and the temperature was then increased under the same Programmed Temperature Ramp as recited herein under the description for Invention Support K. After such Programmed Temperature Ramp heating, the porcelain crucible was then allowed to cool for a time period of about 2 hours to thereby provide a calcium aluminate catalyst support.

Support J (Control) was prepared as described herein under EXAMPLE I.

Physical characteristics from analysis, such as surface area, pore volume, average pore diameter, and crystalline domain size, for Supports J, K, L, and M are summarized below in Table II. The "crystalline domain size" was determined from the line broadening of the X-ray diffraction profile. In addition, the X-ray diffraction profile confirmed that Support J had a zinc aluminate structure, Support K had a magnesium aluminate structure, and supports L and M each had a calcium aluminate structure.

TABLE II

| Support | Calcining Temperature (° C.) | Surface Area ($m^2/g$) | Pore Volume (mL/g) | Average Pore Diameter (ang.) | Metal Aluminate CDS (ang.) | alpha-$Al_2O_3$ CDS (ang.) | delta-$Al_2O_3$ CDS (ang.) | theta-$Al_2O_3$ CDS (ang.) | gamma-$Al_2O_3$ CDS (ang.) |
|---|---|---|---|---|---|---|---|---|---|
| K (Invention) ($MgO.Al_2O_3$) | 1100 | 78 | 0.136 | 692 | 580 | 190 | ND | ND | ND |
| L (Invention) ($CaO.Al_2O_3$) | 1100 | 74 | 0.143 | 781 | ND* | ND | ND | ND | ND |
| M (Invention) ($CaO.Al_2O_3$) | 1100 | 11 | 0.129 | 468 | 405 | 535 | 60 | ND | ND |
| J (Invention) ($ZnO.Al_2O_3$) | 1100 (steam) | 53 | 0.533 | 395 | 100 | >2000 | 150 | 300 | ND |

CDS = Crystalline Domain Size
ang. = angstroms
ND = Not Determined
* = X-ray diffraction profile confirmed that Support L had a calcium aluminate structure The data in Table II demonstrate that the inventive process(es) described herein can be used to produce a metal aluminate catalyst support such as a magnesium aluminate catalyst support or a calcium aluminate catalyst support.

What is claimed is:

1. A process of making a metal aluminate catalyst support comprising:
   (a) incorporating alumina with a melted metal component to thereby provide a metal-incorporated alumina, and
   (b) calcining said metal-incorporated alumina under a calcining condition to thereby provide said metal aluminate catalyst support wherein said calcining condition comprises a temperature in the range of from about 1100° C. to about 1350° C., a pressure in the range of from about 7 pounds per square inch absolute (psia) to about 750 psia, and a time period in the range of from about 1 hour to about 60 hours; and
   further wherein said melted metal component comprises a metal component having been melted under a melting condition.

2. A process according to claim 1 wherein said incorporating step (a) comprises impregnating said alumina with said melted metal component.

3. A process according to claim 2 wherein said melting condition comprises:
   a temperature below a decomposition temperature of said metal component,
   a time period in the range of from about 1 minute to about 2 hours, and
   a pressure in the range of from about atmospheric to about 150 psia.

4. A process according to claim 3 wherein said temperature of said melting condition is in the range of from about 25 ° C. to about 160° C.

5. A process according to claim 3 wherein said impregnating comprises adding said melted metal component to said alumina by pouring said melted metal component onto the surface of said alumina to thereby provide a metal-incorporated alumina having substantially all the surface area of said alumina coated with said melted metal component.

6. A process according to claim 5 wherein said melted metal component is poured over the surface of said alumina while said alumina is under constant stirring or tumbling.

7. A process according to claim 6 wherein said metal component is selected from the group consisting of a zinc component, a magnesium component, a calcium component, a barium component, a beryllium component, a cobalt component, an iron component, a manganese component, a strontium component, a lithium component, a potassium component, and combinations thereof.

8. A process according to claim 7 wherein said metal component is selected from the group consisting of a zinc component, a magnesium component, a calcium component, and combinations thereof.

9. A process according to claim 1 wherein the amount of said metal component incorporated with said alumina provides for said metal aluminate catalyst support having an amount of metal aluminate generally in the range of from about 1 weight percent of the total weight of said metal aluminate catalyst support to about 100 weight percent.

10. A process according to claim 1 wherein said metal component is selected from the group consisting of a zinc component, a magnesium component, a calcium component, a barium component, a beryllium component, a cobalt component, an iron component, a manganese component, a strontium component, a lithium component, a potassium component, and combinations thereof.

11. A process according to claim 10 wherein said zinc component is selected from the group consisting of zinc nitrate hexahydrate, zinc nitrate, hydrated zinc nitrate, zinc chloride, zinc acetate dihydrate, zinc acetylacetonate hydrate, zinc carbonate hydroxide monohydrate, zinc perchlorate hexahydrate, hydrated zinc sulfate, zinc sulfate monohydrate, zinc sulfate heptahydrate, and combinations thereof.

12. A process according to claim 11 wherein said zinc component is zinc nitrate hexahydrate.

13. A process according to claim 10 wherein said magnesium component is selected from the group consisting of magnesium nitrate hexahydrate, magnesium nitrate, hydrated magnesium nitrate, magnesium chloride, hydrated magnesium chloride, magnesium chloride hexahydrate, magnesium acetate tetrahydrate, magnesium acetylacetonate dihydrate, magnesium carbonate hydroxide pentahydrate, magnesium perchlorate, magnesium perchlorate hexahydrate, magnesium sulfate, magnesium sulfate heptahydrate, magnesium sulfate monohydrate, and combinations thereof.

14. A process according to claim 13 wherein said magnesium component is magnesium nitrate hexahydrate.

15. A process according to claim 10 wherein said calcium component is selected from the group consisting of calcium nitrate tetrahydrate, calcium nitrate, hydrated calcium nitrate, calcium chloride, hydrated calcium chloride, calcium chloride dihydrate, calcium chloride hexahydrate, calcium chloride hydrate, calcium acetate hydrate, calcium acetate monohydrate, calcium acetylacetonate hydrate, calcium perchlorate tetrahydrate, calcium sulfate, calcium sulfate dihydrate, calcium sulfate hemihydrate, and combinations thereof.

16. A process according to claim 15 wherein said calcium component is calcium nitrate tetrahydrate.

17. A process according to claim 10 wherein said barium component is selected from the group consisting of barium nitrate, hydrated barium nitrate, barium chloride, hydrated barium chloride, barium chloride dihydrate, barium acetate, barium acetylacetonate hydrate, barium carbonate, barium perchlorate, barium perchlorate trihydrate, barium sulfate, and combinations thereof.

18. A process according to claim 10 wherein said beryllium component is selected from the group consisting of beryllium nitrate trihydrate, hydrated beryllium nitrate, beryllium chloride, hydrated beryllium sulfate, beryllium sulfate tetrahydrate, and combinations thereof.

19. A process according to claim 10 wherein said cobalt component is selected from the group consisting of cobalt nitrate hexahydrate, hydrated cobalt nitrate, cobalt chloride, hydrated cobalt chloride, cobalt chloride hexahydrate, cobalt chloride hydrate, cobalt acetate tetrahydrate, cobalt acetylacetonate, cobalt acetylacetonate hydrate, cobalt carbonate hydrate, cobalt perchlorate hexahydrate, hydrated cobalt sulfate, cobalt sulfate hydrate, and combinations thereof.

20. A process according to claim 10 wherein said iron component is selected from the group consisting of iron nitrate nonahydrate, hydrated iron nitrate, iron chloride, hydrated iron chloride, iron chloride tetrahydrate, iron chloride hexahydrate, iron acetate, iron acetylacetonate, iron perchlorate hexahydrate, hydrated iron sulfate, iron sulfate heptahydrate, and combinations thereof.

21. A process according to claim 10 wherein said manganese component is selected from the group consisting of manganese nitrate hexahydrate, hydrated manganese nitrate, manganese nitrate hydrate, manganese chloride, hydrated manganese chloride, manganese chloride tetrahydrate, manganese acetate dihydrate, manganese acetate tetrahydrate, manganese acetylacetonate, manganese carbonate, manganese perchlorate hexahydrate, hydrated manganese sulfate, manganese sulfate monohydrate, and combinations thereof.

22. A process according to claim 10 wherein said strontium component is selected from the group consisting of strontium nitrate, hydrated strontium nitrate, strontium chloride, hydrated strontium chloride, strontium chloride hexahydrate, strontium acetate, strontium acetylacetonate, strontium carbonate, strontium perchlorate hydrate, hydrated strontium sulfate, strontium sulfate, and combinations thereof.

23. A process according to claim 10 wherein said lithium component is selected from the group consisting of lithium nitrate, hydrated lithium nitrate, lithium chloride, hydrated lithium chloride, lithium chloride hydrate, lithium acetate dihydrate, lithium acetylacetonate, lithium perchlorate, lithium perchlorate trihydrate, lithium sulfate, lithium sulfate monohydrate, and combinations thereof.

24. A process according to claim 10 wherein said potassium component is selected from the group consisting of potassium nitrate, hydrated potassium nitrate, potassium chloride, hydrated potassium chloride, potassium acetylacetonate hemihydrate, potassium carbonate sesquihydrate, potassium perchlorate, potassium sulfate, and combinations thereof.

25. A process according to claim 10 wherein said barium component is barium nitrate; said beryllium component is beryllium nitrate trihydrate; said cobalt component is cobalt nitrate hexahydrate; said iron component is iron nitrate nonahydrate; said manganese component is manganese nitrate hexahydrate; said strontium component is strontium nitrate; said lithium component is lithium nitrate; and said potassium component is potassium nitrate.

26. A process according to claim 1 wherein said metal-incorporated alumina is subjected to drying under a drying condition before being subjected to said calcining step (b).

27. A process according to claim 26 wherein said drying condition comprises:

a temperature in the range of from about 80° C. to about 140° C., a time period in the range of from about 0.5 hour to about 60 hours, and a pressure in the range of from about atmospheric to about 150 psia.

28. A process according to claim 1 wherein said alumina in incorporating step (a) has been heated by subjecting said alumina to a heating condition before said alumina is incorporated with said metal component and further wherein said heating condition comprises:

a temperature in the range of from about 80° C. to about 150° C., a time period in the range of from about 1 minute to about 2 hours, and a pressure in the range of from about atmospheric to about 150 psia.

29. A process according to claim 1 wherein after said calcining step (b) a metal aluminate forms in, on the outside surface of, or on, but not limited to, the surface of, said alumina.

30. A process according to claim 1 wherein the amount of said metal aluminate of said metal aluminate catalyst support is in the range of from about 1 weight percent based on the total weight of said metal aluminate catalyst support to about 100 weight percent.

31. A process according to claim 30 wherein an amount of alpha alumina of said metal aluminate catalyst support is in the range of from about 0 weight percent based on the total weight of said metal aluminate catalyst support to about 99 weight percent.

32. A process according to claim 31 wherein an amount of gamma alumina of said metal aluminate catalyst support is in the range of from about 0 weight percent based on the total weight of said metal aluminate catalyst support to about 60 weight percent.

33. A process according to claim 32 wherein the surface area of said metal aluminate catalyst support is in the range of from 10 $m^2/g$ to 80 $m^2/g$.

34. A process according to claim 33 wherein the pore volume of said metal aluminate catalyst support is in the range of from 0.10 mL/g to 1 mL/g.

35. A process according to claim 34 wherein the average pore diameter of said metal aluminate catalyst support is in the range of from 50 angstroms to 450 angstroms.

36. A process according to claim 35 wherein the crystalline domain size of the metal aluminate of said metal aluminate catalyst support is in the range of from about 25 angstrom to about 1750 angstroms.

37. A process according to claim 36 wherein when alpha alumina is present in said metal aluminate catalyst support said alpha alumina has a crystalline domain size in the range of from about 25 angstroms to about 3000 angstroms.

38. A process according to claim 1 wherein said alumina in said incorporating step (a) is selected from the group consisting of alpha alumina, beta alumina, delta alumina, eta alumina, gamma alumina and combinations thereof.

39. A process according to claim 38 wherein said alumina in said incorporating step (a) is gamma alumina.

40. A process according to claim 39 wherein said alumina in said incorporating step (a) is in the form of tablets, pellets, extrudates, spheres, and combinations thereof.

41. A process according to claim 40 wherein said alumina in said incorporating step (a) has a surface area in the range of from about 5 $m^2/g$ to about 400 $m^2/g$; a pore volume in the range of from about 0.05 mL/g to about 2 mL/g; an average pore diameter in the range of from about 5 angstroms to about 600 angstroms; and a particle size in the range of from about 0.5 mm to about 10 mm.

* * * * *